US012586771B2

(12) United States Patent
Kovarik et al.

(10) Patent No.: US 12,586,771 B2
(45) Date of Patent: Mar. 24, 2026

(54) ELECTRODE PROTRUSION ADJUSTMENT FOR MAXIMIZING PRESSURE DROP ACROSS LIQUID TRANSPORT CONDUIT

(71) Applicant: DH Technologies Development Pte. Ltd., Singapore (SG)

(72) Inventors: Peter Kovarik, Concord (CA); Chang Liu, Richmond Hill (CA)

(73) Assignee: DH Technologies Development Pte. Ltd., Singapore (SG)

( * ) Notice: Subject to any disclaimer, the term of this patent is extended or adjusted under 35 U.S.C. 154(b) by 328 days.

(21) Appl. No.: 18/261,918

(22) PCT Filed: Jan. 20, 2022

(86) PCT No.: PCT/IB2022/050489
§ 371 (c)(1),
(2) Date: Jul. 18, 2023

(87) PCT Pub. No.: WO2022/157668
PCT Pub. Date: Jul. 28, 2022

(65) Prior Publication Data
US 2024/0096614 A1 Mar. 21, 2024

Related U.S. Application Data

(60) Provisional application No. 63/139,498, filed on Jan. 20, 2021.

(51) Int. Cl.
*H01J 49/16* (2006.01)

(52) U.S. Cl.
CPC .................................. *H01J 49/167* (2013.01)

(58) Field of Classification Search
CPC .......... H01J 49/10; H01J 49/16; H01J 49/165; H01J 49/167
See application file for complete search history.

(56) References Cited

U.S. PATENT DOCUMENTS 6,501,073 B1 12/2002 Mylchreest et al.
7,923,681 B2 4/2011 Collings et al.
(Continued)

FOREIGN PATENT DOCUMENTS

EP 1963024 9/2008
WO 00/19193 4/2000
(Continued)

OTHER PUBLICATIONS

Hager et al., "Product ion scanning using a Q-q-Q linear ion trap (Q Trap) mass spectrometer", Rapid Communications in Mass Spectrometry, 2003; 17: 1056-1064.
(Continued)

*Primary Examiner* — David E Smith
(74) *Attorney, Agent, or Firm* — Merchant & Gould P.C.

(57) ABSTRACT

A method of adjusting a position of a tip of an electrode relative to an end of a nebulizer nozzle of a mass spectrometry device includes providing a conduit and the electrode connected to the conduit at a first end of the conduit. The electrode tip is disposed at a first position relative to the nebulizer nozzle end. The pressure gauge is connected to a second end of the conduit. A gas ejection is initiated from the nozzle with the electrode tip at the first position. During the gas ejection, the position of the electrode tip is adjusted from the first position towards a second position relative to the nozzle end. Adjusting the position from the first position towards the second position is terminated when the pressure gauge displays a pressure condition. Once adjusting is terminated, the electrode tip is at the second position.

20 Claims, 12 Drawing Sheets

(56) References Cited

U.S. PATENT DOCUMENTS

| | | | | |
|---|---|---|---|---|
| 10,770,277 | B2 | 9/2020 | Datwani et al. | |
| 2003/0201390 | A1 | 10/2003 | Corso et al. | |
| 2005/0145787 | A1 | 7/2005 | Prosser | |
| 2013/0056631 | A1 * | 3/2013 | Tomany ................ | H01J 49/168 250/288 |
| 2019/0157060 | A1 | 5/2019 | Datwani et al. | |

FOREIGN PATENT DOCUMENTS

| | | |
|---|---|---|
| WO | 2018/045208 | 3/2018 |
| WO | 2021/140713 | 7/2021 |

OTHER PUBLICATIONS

PCT International Search Report and Written Opinion in International Application PCT/IB2022/050489, mailed Apr. 26, 2022, 13 pages.

PCT International Preliminary Reporton Patentability in International Application PCT/IB2022/050489, mailed Aug. 3, 2023, 10 pages.

Semerjian, Hratch G., Ed., "ICLASS-91 NIST SP 813", NIST, National Institute of Standards and Technology, 96, Jul. 18, 1991, pp. 857-864.

* cited by examiner

ELECTRODE PROTRUSION ADJUSTMENT FOR MAXIMIZING PRESSURE DROP ACROSS LIQUID TRANSPORT CONDUIT

CROSS-REFERENCE TO RELATED APPLICATION

This application is a National Stage Application of PCT/IB2022/050489, filed on Jan. 20, 2022, which claims the benefit of U.S. Provisional Patent Application No. 63/139,498 filed on Jan. 20, 2021, the entire disclosures of which are incorporated herein by reference in their entireties. To the extent appropriate, a claim of priority is made to each of the above disclosed applications.

BACKGROUND

Mass spectrometry (MS) based methods can achieve label-free, universal mass detection of a wide range of analytes with exceptional sensitivity, selectivity, and specificity. As a result, there is significant interest in improving the throughput of MS-based analysis for many applications. A number of sample introduction systems for MS-based analysis have been improved to provide higher throughput. Acoustic droplet ejection (ADE) has been combined with an open port interface (OPI) to provide a sample introduction system for high-throughput mass spectrometry. The sample is ejected from electrospray ionization (ESI) source and analyzed by a MS.

SUMMARY

In one aspect, the technology relates to a method of adjusting a position of a tip of an electrode relative to an end of a nebulizer nozzle of a mass spectrometry device, the method including: providing a conduit and the electrode connected to the conduit at a first end of the conduit, wherein the electrode tip is disposed at a first position relative to the nebulizer nozzle end; connecting a pressure gauge to a second end of the conduit opposite the first end; initiating a gas ejection from the nebulizer nozzle with the electrode tip at the first position; during the gas ejection, adjusting the position of the electrode tip from the first position towards a second position relative to the nebulizer nozzle end; and terminating adjusting the position from the first position towards the second position when the pressure gauge displays a pressure condition, wherein upon terminating adjusting the position from the first position towards the second position, the electrode tip is at the second position. In an example, when at the first position, the electrode tip is flush with the nebulizer nozzle end. In another example, the pressure condition includes a maximum pressure drop. In yet another example, the pressure condition includes a pressure drop lower than a previously-displayed maximum pressure drop. In still another example, the method further includes, subsequent to terminating adjusting the position from the first position to the second position, adjusting the position of the electrode tip from the second position towards a third position relative to the nebulizer nozzle end.

In another example of the above aspect, the method further includes terminating adjusting the position from the second position towards the third position when the pressure gauge displays the previously-displayed maximum pressure drop, wherein upon terminating adjusting the position from the second position towards the third position, the electrode tip is at the third position. In an example, the third position is between the first position and the second position. In another example, at least one of the first position, the second position, and the third position is on a first side of the nebulizer nozzle end and wherein at least another of the first position, the second position, and the third position is on a second side of the nebulizer nozzle end. In yet another example, initiating the gas ejection includes activating a source of a gas. In still another example, the gas ejection is at a constant flowrate.

In another aspect, the technology relates to a method of adjusting a position of a tip of an electrode relative to an end of a nebulizer nozzle of a mass spectrometry device, the method including: providing the electrode, wherein the electrode is connected to a conduit at a first end of the conduit, and wherein the electrode tip is disposed at a first position relative to the nebulizer nozzle end; ejecting a nebulizer gas from the nebulizer nozzle; during ejection of the nebulizer gas, receiving a plurality of pressure signals from a pressure gauge connected to a second end of the conduit while adjusting the position of the electrode tip from the first position towards a second position relative to the nebulizer nozzle end; and terminating adjusting the position based at least in part on at least one of the received plurality of pressure signals, wherein upon terminating adjusting the position, the electrode tip is at the second position. In an example, the method further includes calculating a maximum pressure drop based at least in part on the received plurality of pressure signals and terminating adjusting the position when at least one of the plurality of received pressure signals corresponds to the calculated maximum pressure drop. In another example, the calculated maximum pressure drop is based at least in part on a pressure curve generated based at least in part on the received plurality of pressure signals. In yet another example, the calculated maximum pressure drop is based at least in part on a sign change in slope of the pressure curve. In still another example, the at least one of the received pressure signals corresponds to a pressure drop lower than a previously-received maximum pressure drop.

In another example of the above aspect, the method further includes, subsequent to terminating adjusting the position from the first position to the second position, adjusting the position of the electrode tip from the second position towards a third position relative to the nebulizer nozzle end. In an example, the method further includes terminating adjusting the position from the second position towards the third position when at least one of the plurality of received pressure signal corresponds to a previously-received pressure signal. In another example, the previously-received pressure signal corresponds to a previously-received maximum pressure drop. In yet another example, the method further includes securing a final position of the electrode tip in the second position. In still another example, the method further includes securing a final position of the electrode tip in the third position.

DETAILED DESCRIPTION

Figure 1:
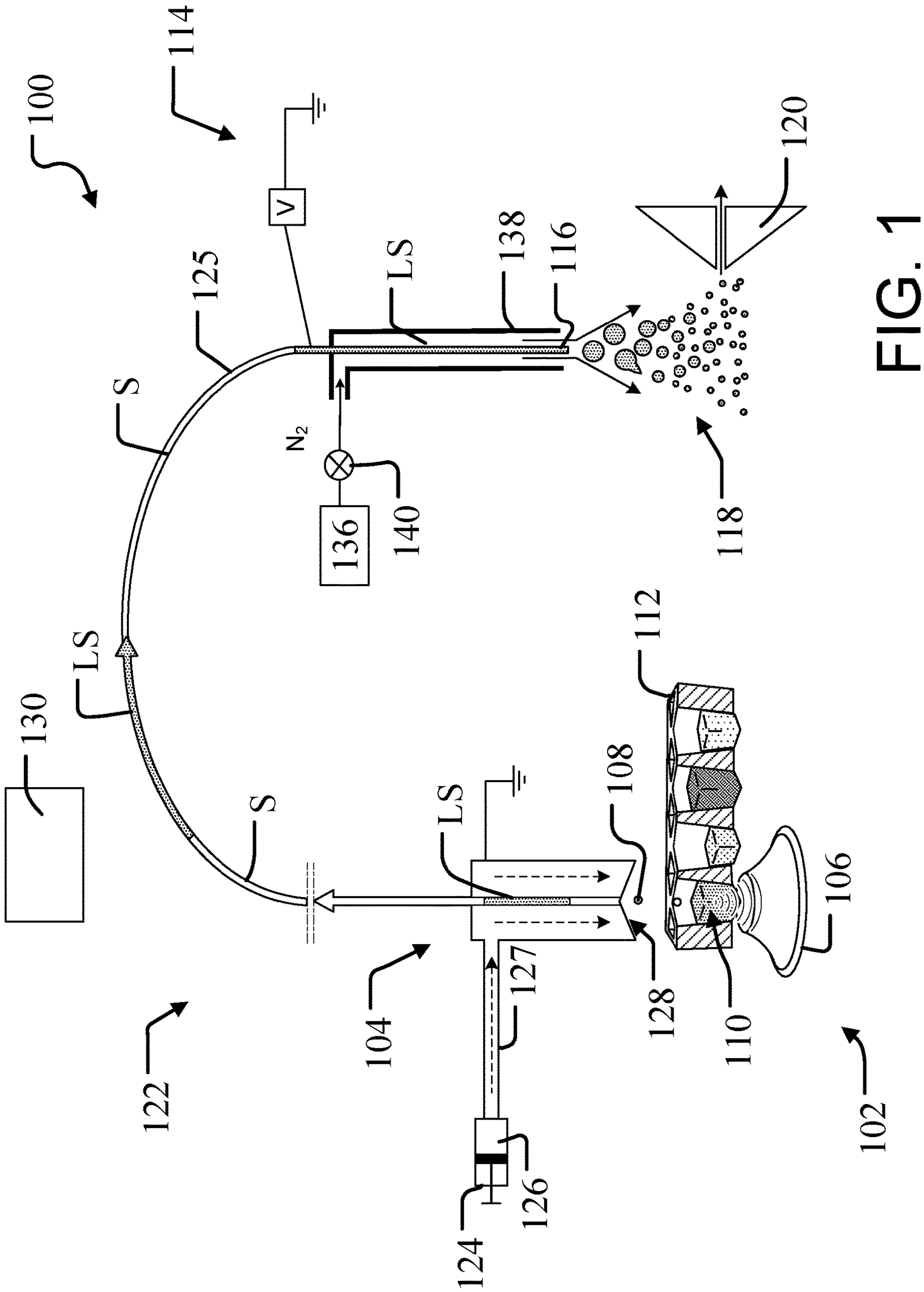
FIG. 1 is a schematic view of an example system combining acoustic droplet ejection (ADE) with an open port interface (OPI) sampling interface and electrospray ionization (ESI) source.

FIG. 1 is a schematic view of an example system 100 combining an ADE 102 with an OPI sampling interface 104 and ESI source 114. The system 100 may be a mass analysis instrument such as a mass spectrometry device that is for ionizing and mass analyzing analytes received within an open end of a sampling OPI. Such a system 100 is described, for example, in U.S. Pat. No. 10,770,277, the disclosure of which is incorporated by reference herein in its entirety. The ADE 102 includes an acoustic ejector 106 that is configured to eject a droplet 108 from a reservoir 112 into the open end of sampling OPI 104. As shown in FIG. 1, the example system 100 generally includes the sampling OPI 104 in liquid communication with the ESI source 114 for discharging a liquid containing one or more sample analytes (e.g., via electrospray electrode 116) into an ionization chamber 118, and a mass analyzer detector (depicted generally at 120) in communication with the ionization chamber 118 for downstream processing and/or detection of ions generated by the ESI source 114. Due to the configuration of the nebulizer nozzle 138 and electrospray electrode 116 of the ESI source 114, samples ejected therefrom are transformed into the gas phase. A liquid handling system 122 (e.g., including one or more pumps 124 and one or more conduits 125) provides for the flow of liquid from a solvent reservoir 126 to the sampling OPI 104 and from the sampling OPI 104 to the ESI source 114. The solvent reservoir 126 (e.g., containing a liquid, desorption solvent) can be liquidly coupled to the sampling OPI 104 via a supply conduit 127 through which the liquid can be delivered at a selected volumetric rate by the pump 124 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, the flow of liquid into and out of the sampling OPI 104 occurs within a sample space accessible at the open end such that one or more droplets 108 can be introduced into the liquid boundary 128 at the sample tip and subsequently delivered to the ESI source 114.

The system 100 includes an ADE 102 that is configured to generate acoustic energy that is applied to a liquid contained within a reservoir 110 that causes one or more droplets 108 to be ejected from the reservoir 110 into the open end of the sampling OPI 104. A controller 130 can be operatively coupled to and configured to operate any aspect of the system 100. This enables the ADE 106 to inject droplets 108 into the sampling OPI 104 as otherwise discussed herein substantially continuously or for selected portions of an experimental protocol by way of non-limiting example. Controller 130 can be, but is not limited to, a microcontroller, a computer, a microprocessor, or any device capable of sending and receiving control signals and data. Wired or wireless connections between the controller 130 and the remaining elements of the system 100 are not depicted but would be apparent to a person of skill in the art.

As shown in FIG. 1, the ESI source 114 can include a source 136 of pressurized gas (e.g. nitrogen, air, or a noble gas) that supplies a high velocity nebulizing gas flow to the nebulizer nozzle 138 that surrounds the outlet tip of the electrospray electrode 116. As depicted, the electrospray electrode 116 protrudes from a distal end of the nebulizer nozzle 138. The pressured gas interacts with the liquid discharged from the electrospray electrode 116 to enhance the formation of the sample plume and the ion release within the plume for sampling by mass analyzer detector 120, e.g., via the interaction of the high speed nebulizing flow and jet of liquid sample (e.g., analyte-solvent dilution). The liquid discharged may include liquid samples LS received from each reservoir 110 of the well plate 112. The liquid samples LS are diluted with the solvent S and typically separated from other samples by volumes of the solvent S (hence, as flow of the solvent S moves the liquid samples LS from the OPI 104 to the ESI source 114, the solvent S may also be referred to herein as a transport liquid). The nebulizer gas can be supplied at a variety of flow rates, for example, in a range from about 0.1 L/min to about 20 L/min, which can also be controlled under the influence of controller 130 (e.g., via opening and/or closing valve 140).

It will be appreciated that the flow rate of the nebulizer gas can be adjusted (e.g., under the influence of controller 130) such that the flow rate of liquid within the sampling OPI 104 can be adjusted based, for example, on suction/aspiration force generated by the interaction of the nebulizer gas and the analyte-solvent dilution as it is being discharged from the electrospray electrode 116 (e.g., due to the Venturi effect). The ionization chamber 118 can be maintained at atmospheric pressure, though in some examples, the ionization chamber 118 can be evacuated to a pressure lower than atmospheric pressure.

It will also be appreciated by a person skilled in the art and in light of the teachings herein that the mass analyzer detector 120 can have a variety of configurations. Generally, the mass analyzer detector 120 is configured to process (e.g., filter, sort, dissociate, detect, etc.) sample ions generated by the ESI source 114. By way of non-limiting example, the mass analyzer detector 120 can be a triple quadrupole mass spectrometer, or any other mass analyzer known in the art and modified in accordance with the teachings herein. Other non-limiting, exemplary mass spectrometer systems that can be modified in accordance with various aspects of the systems, devices, and methods disclosed herein can be found, for example, in an article entitled "Product ion scanning using a Q-q-Q linear ion trap (Q TRAP) mass spectrometer," authored by James W. Hager and J. C. Yves Le Blanc and published in Rapid Communications in Mass Spectrometry (2003; 17: 1056-1064); and U.S. Pat. No. 7,923,681, entitled "Collision Cell for Mass Spectrometer," the disclosures of which are hereby incorporated by reference herein in their entireties.

Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements can be included in the system 100 including, for example, an ion mobility spectrometer (e.g., a differential mobility spectrometer) that is disposed between the ionization chamber 118 and the mass analyzer detector 120 and is configured to separate ions based on their mobility difference between in high-field and low-field). Additionally, it will be appreciated that the mass analyzer detector 120 can comprise a detector that can detect the ions that pass through the analyzer detector 120 and can, for example, supply a signal indicative of the number of ions per second that are detected.

Figure 2:
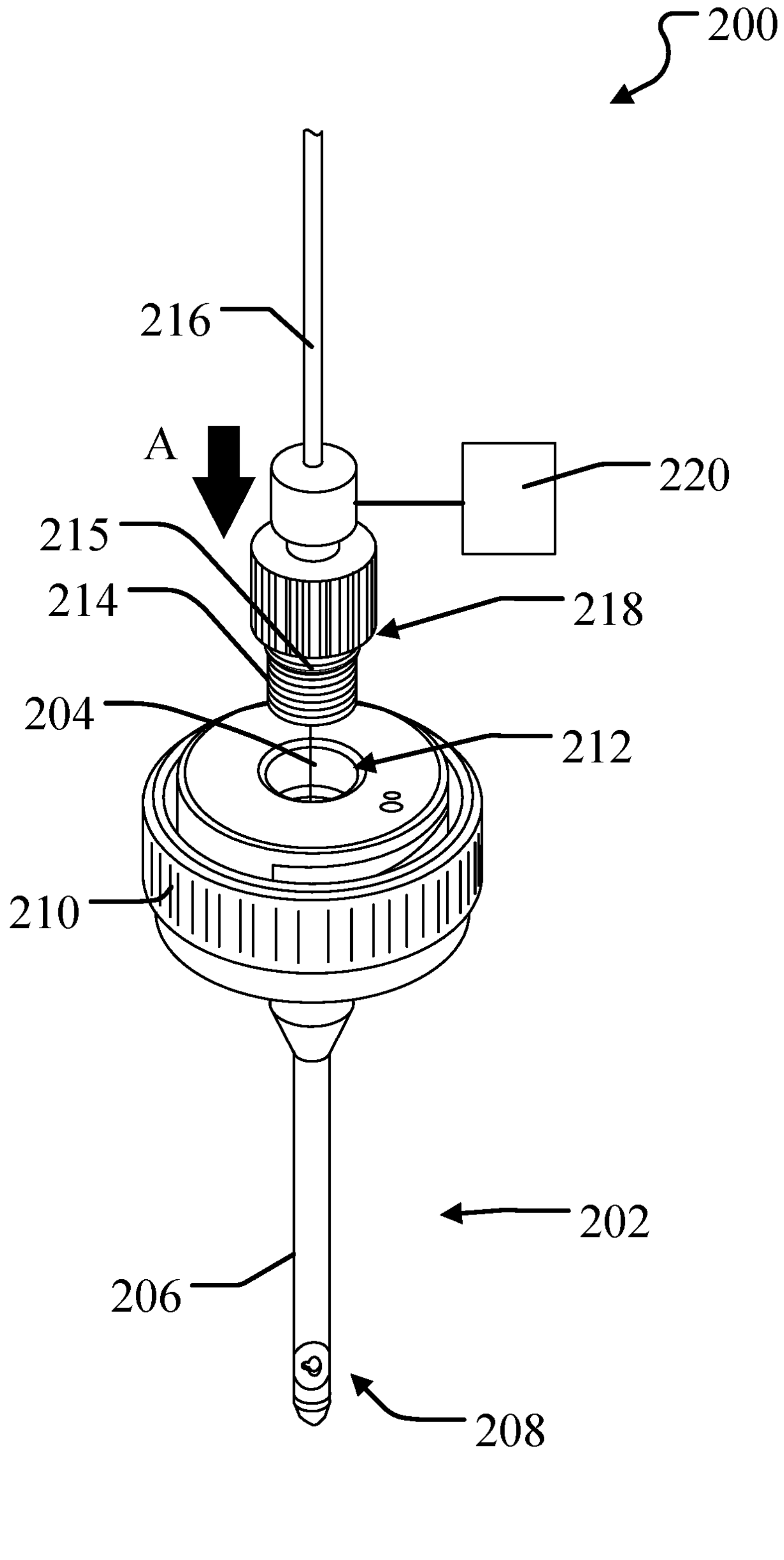
FIG. 2 a partial perspective view of an ESI.

FIG. 2 is a partial perspective view of an ESI source 200, namely a nebulizer nozzle 202 and an inner electrospray electrode 204. The nebulizer nozzle 202 includes an outer conduit 206 including a distal end 208 from which liquid may be discharged into an ionization chamber, such as described above. A housing 210 may be utilized to secure the nebulizer nozzle 202 within a mass spectrometry device. The housing 210 defines a central channel 212 through which the electrospray electrode 204 passes. The electrospray electrode 204 may be connected to a threaded base 214 that may be received in a mating threaded portion of the central channel 212. Within the threaded base 214, the electrospray electrode 204 may be fluidically coupled to a conduit 216 of a liquid handling system of the mass spectrometry device. A ferrule 218 may surround a portion of the threaded base 214 and may be rotated so as to advance A a tip (not shown) of the electrospray electrode 204 within the outer conduit 206 of the nebulizer nozzle 202, towards the distal end 208. A compressible O-ring or gasket 215 may be disposed between the ferrule 218 and housing 210 so as to maintain the gas seal regardless of depth of threaded base 214 within the central channel 212. Rotation of the ferrule 218 in an opposite direction may retract the tip of the electrospray electrode 204 away from the distal end 208. In another example, a motor 220 may be used to advance or retract the electrospray electrode 204, in addition to or instead of the manually-rotated ferrule 218.

The position of the electrospray electrode 204 relative to the nebulizer nozzle 202 (e.g., a position disposed therein or protruding therefrom) is directly related to the strength of the Venturi aspiration force (e.g., the pressure drop at the electrode tip) determining the analytical sensitivity and reproducibility, throughput, and matrix tolerance. In addition, the position directly impacts the data reproducibly. In an example, if the protrusion is off by just a small distance (in one example, approximately 40 micrometers), the data coefficient of variation is significantly increased, especially when simultaneously monitoring multiple components. Typically, it is challenging to properly set the position of the electrospray electrode 204 relative to the nebulizer nozzle 202 during the manufacturing process, which results in a reduction of performance.

In standard systems, electrode adjustment is carried out using mass spectrometer signal changes as a guide to iteratively adjust the electrode protrusion until the desired mass spectrometer signal is achieved. For OPI generated peaks, signal quality and throughput depend on transport flow rate, where ability to access higher flow rates results in signal and throughput improvements. Greater motive force is required to sustain higher flows. For OPI, the force comes from pressure drop experienced by the exiting transport gas flow from the ESI. Location of the electrode exit within the expanding nebulizer gas determines the pressure drop the transport liquid experiences. Thus, one aspect of performance relates to the position of the electrode tip relative to the end of the nebulizer nozzle, where the pressure drop is at or near a maximum.

The technologies described herein provide an innovative process to identify the location of the maximum pressure drop within the expanding nebulizer gas. Further, the processes are independent of solvent viscosity used in the MS system, and improve performance based on electrode-nozzle geometry. The processes described herein provide a more systematic, robust, and reproducible method of positioning the electrode tip relative to the end of the nebulizer nozzle that reduces user bias, errors due to visual inspection of spray quality, or incorrect reading of mass spectrometer signal changes. With direct measurement of pressure drop at the nebulizer nozzle, the processes described herein may also be automated without the need for generating a mass spectrometer signal. Once positioned in the desired location, the electrode may be secured for shipment to an end user. Alternatively, the methods described herein may be performed on-site by an end user after receipt of the electrode from the manufacturer.

Figure 3:
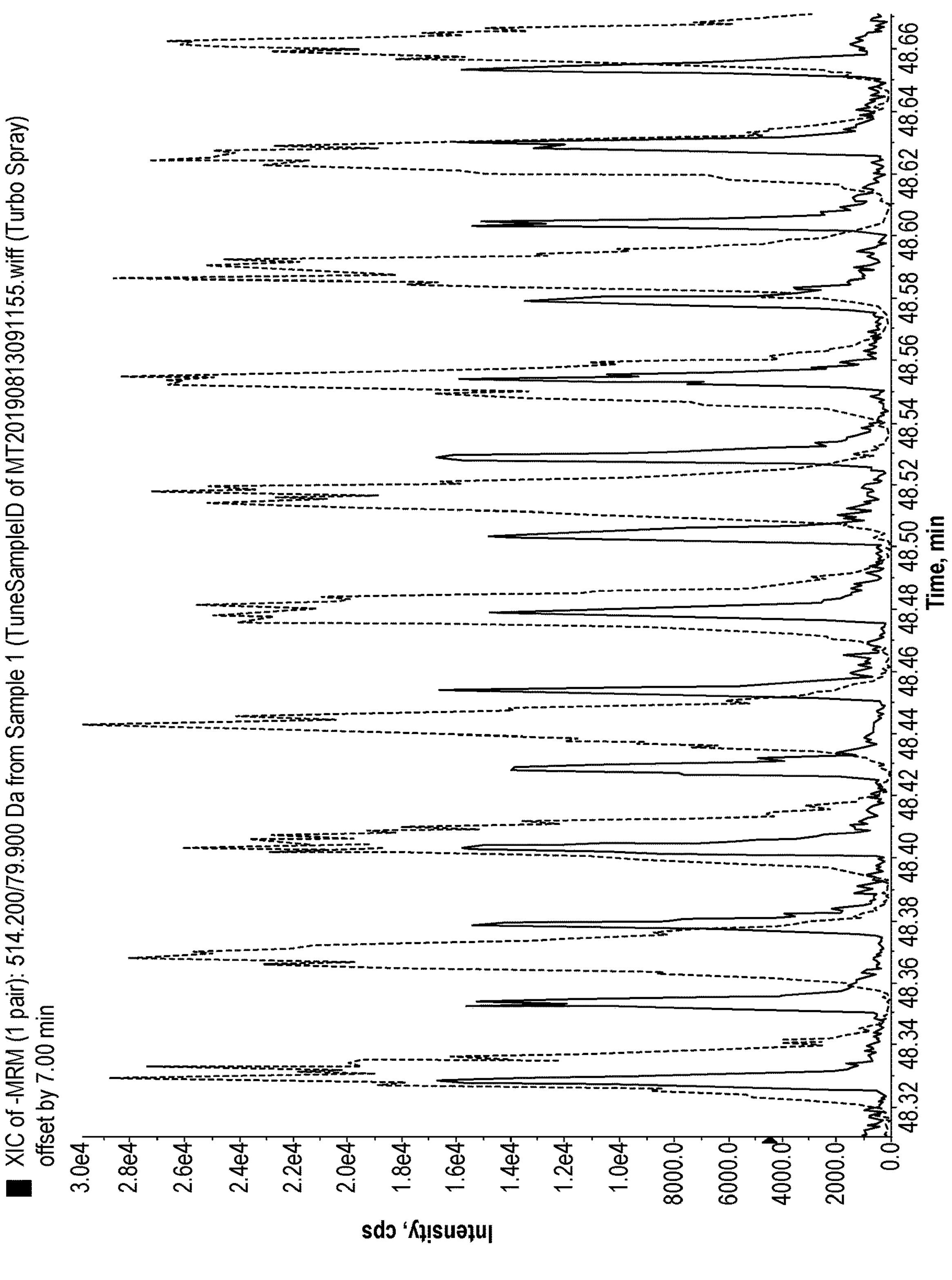
FIG. 3 depicts signal differences measured by a mass spectrometer at two different flow rates through an ESI.

FIG. 3 depicts signal differences measured by a mass spectrometer with the electrode tip positioned at two different positions relative to the nebulizer nozzle end. At both positions, nebulizer gas flow rates are the same (in this example, 9.5 L/min), as are the droplet volumes (approximately −18 nL droplets) and operational temperatures (400° C.). The dotted-line plot indicates an electrode position that is less desirable, which results in lower liquid flow (about 80 μL/min) pulled through the electrode conduit without overflow at the OPI. This is depicted by the wider peaks, where the full width at the base is about 2.0 sec and the ejection frequency corresponds to a 2.5 sec period. In contrast, the solid-line plot indicates an electrode position that is more desirable, which results in higher liquid flow (about 600 μL/min) pulled through the electrode conduit. This is depicted by the narrower peaks, where the full width at the base is about 0.5 sec and the ejection frequency corresponds to a 1.5 sec period. The improved flow rate is indicative of the electrode tip being positioned in the lowest pressure region of the expanding nebulizer gas, improving sample throughput. The lower peak height of the solid-line plot is due to the operational temperature (spray desolvation temperature) being kept constant at a level optimized for the lower flowrate.

Figure 4:
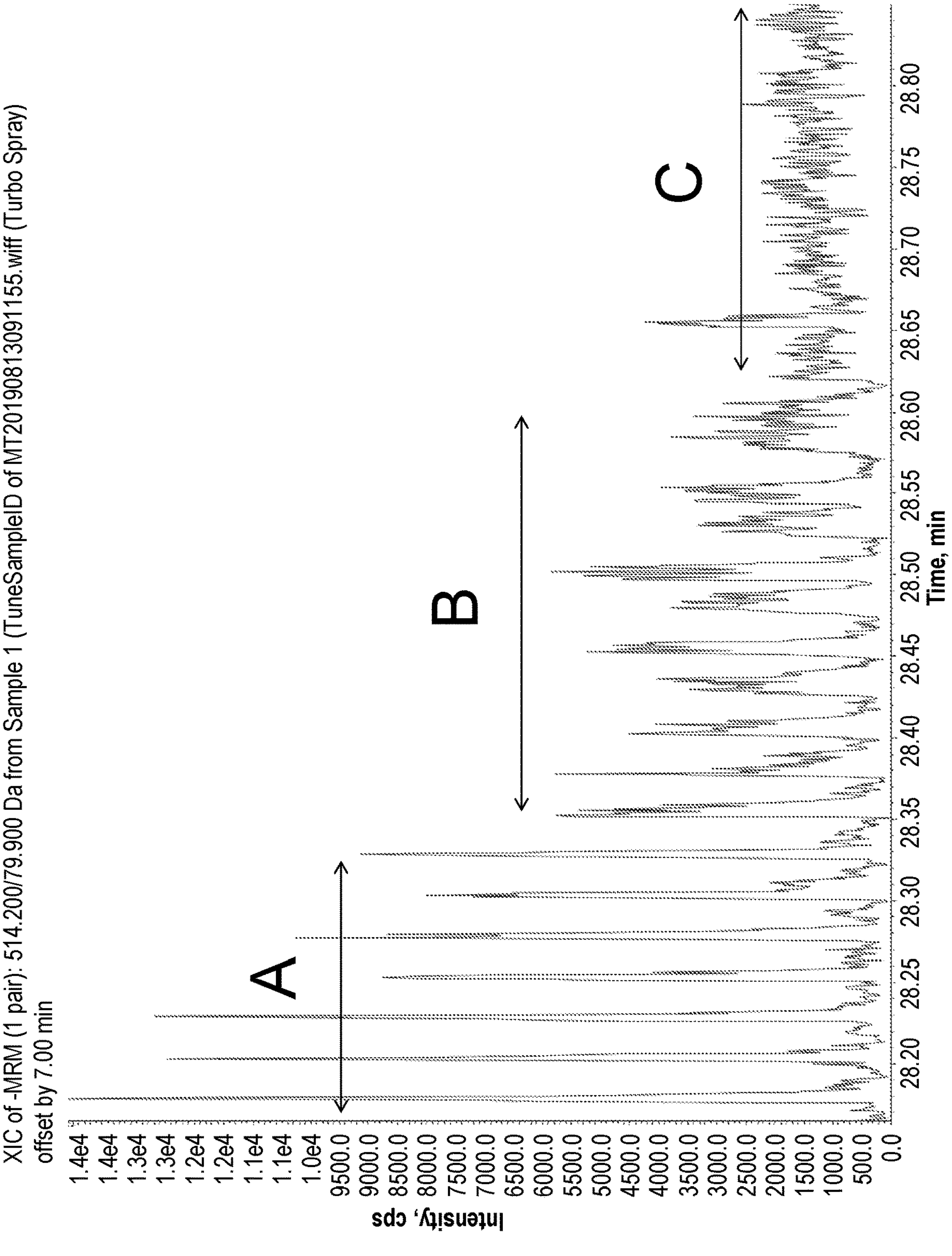
FIG. 4 depicts a plot of mass spectrometry signal change based on electrode position.

FIG. 4 depicts a plot of mass spectrometry signal change based on electrode position. In the depicted plot, the flow rate is constant; more specifically, it is set at the highest flow rate allowed by the electrode protrusion and nebulizer gas flow. Operational temperature is optimized for this flow rate. Only the electrode position is changed. Region A depicts a preferred flow regime for sample delivery as indicated by the depicted narrow peaks. Region A is thus indicative of maximum nebulizer gas flow at maximum pull (caused by pressure drop at the nebulizer nozzle end). Here, the liquid surface inside the OPI deflects toward the sample removal conduit of the OPI. As the electrode position changes, e.g., as the position leaves the preferred location, the pressure drop reduces and the OPI begins to fill and overflow. This compromises the mass spectrometry sample signal, causing peaks to become wide and eventually merge as the OPI overflows (which may cause some sample overflow as well). More specifically, region B depicts the condition as the electrode tip moves away from the position of maximum pressure drop. The reduced pressure drop is less able to move the liquid and the OPI begins to fill, resulting in broadening the of peaks. Region C depicts the condition as the electrode tip moves even further away from the position of maximum pressure drop. This further reduces the aspiration force, thus causing the OPI to overflow. This results in merging of the signal peaks, further reducing the signal as some sample overflows the OPI.

Figure 5:
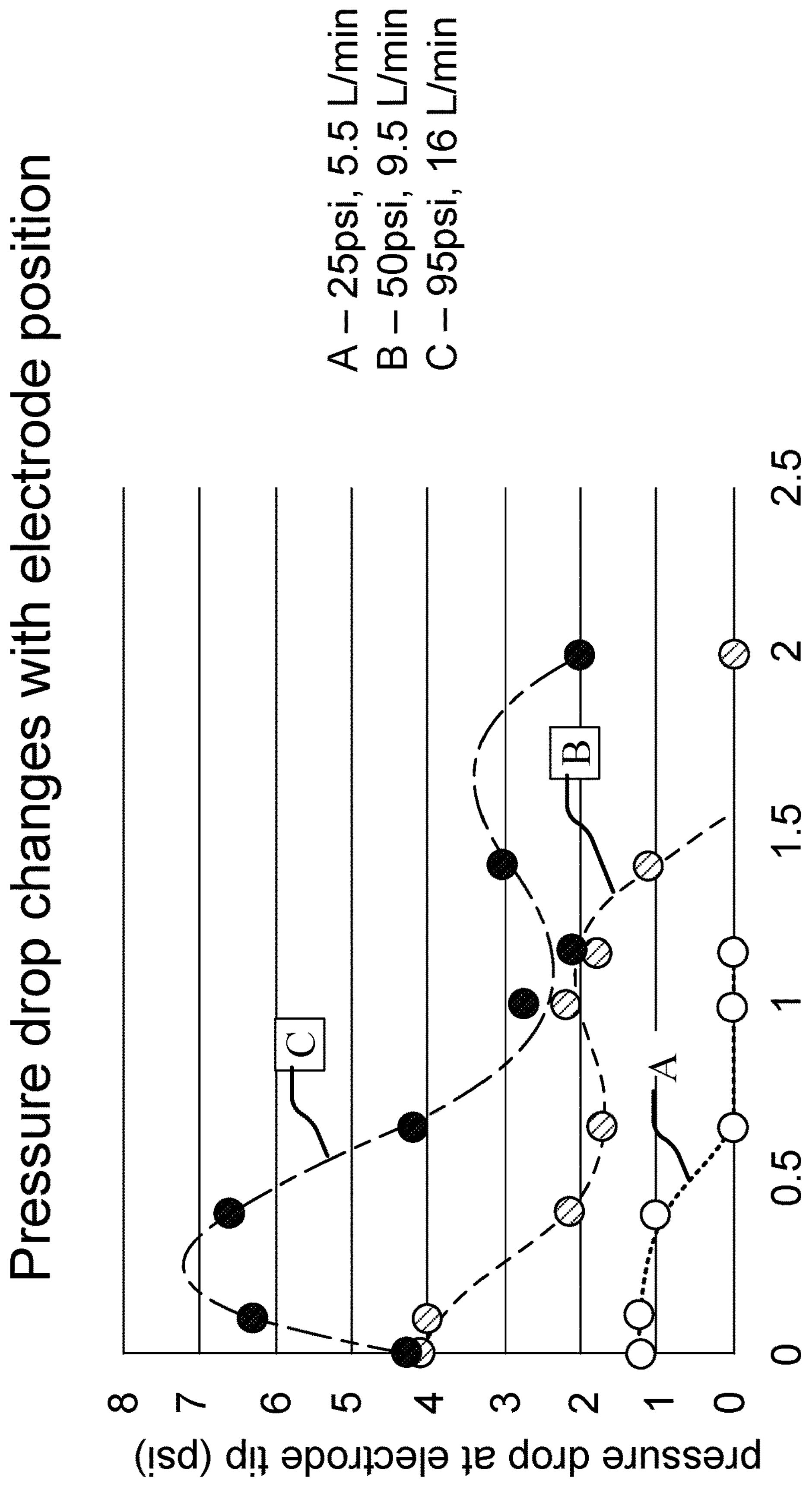
FIG. 5 depicts plots of pressure drop changes while adjusting a position of an electrode tip relative to a nebulizer nozzle end.

FIG. 5 depicts plots of pressure drop changes while adjusting a position of a Turbo Ion Spray electrode (TIS) (available from AB Sciex) for a mass spectrometry device. In general, FIG. 5 depicts the pressure drop at the electrode tip as function of moving the electrode tip relative the nebulizer nozzle. The three curves represent three different nebulizer gas drive pressures and their associated gas flow rates through the nebulizer nozzle. The calculated position of the first minimum within the pressure drop plot for a sonic nozzle expansion is 0.5 mm for Curve A, 0.7 mm for Curve B, and 1.0 mm for curve C. Even though an approximation was used for the nozzle diameter, the calculated values generally correspond with the observed first minimum shown in each respective curve. "Pr" is an under-expansion ratio, as the nozzle operates in an under-expanded mode. In FIG. 5, Pr is 1.78 for Curve A, 3.57 for Curve B, and 7.0 for Curve C.

Figure 6:
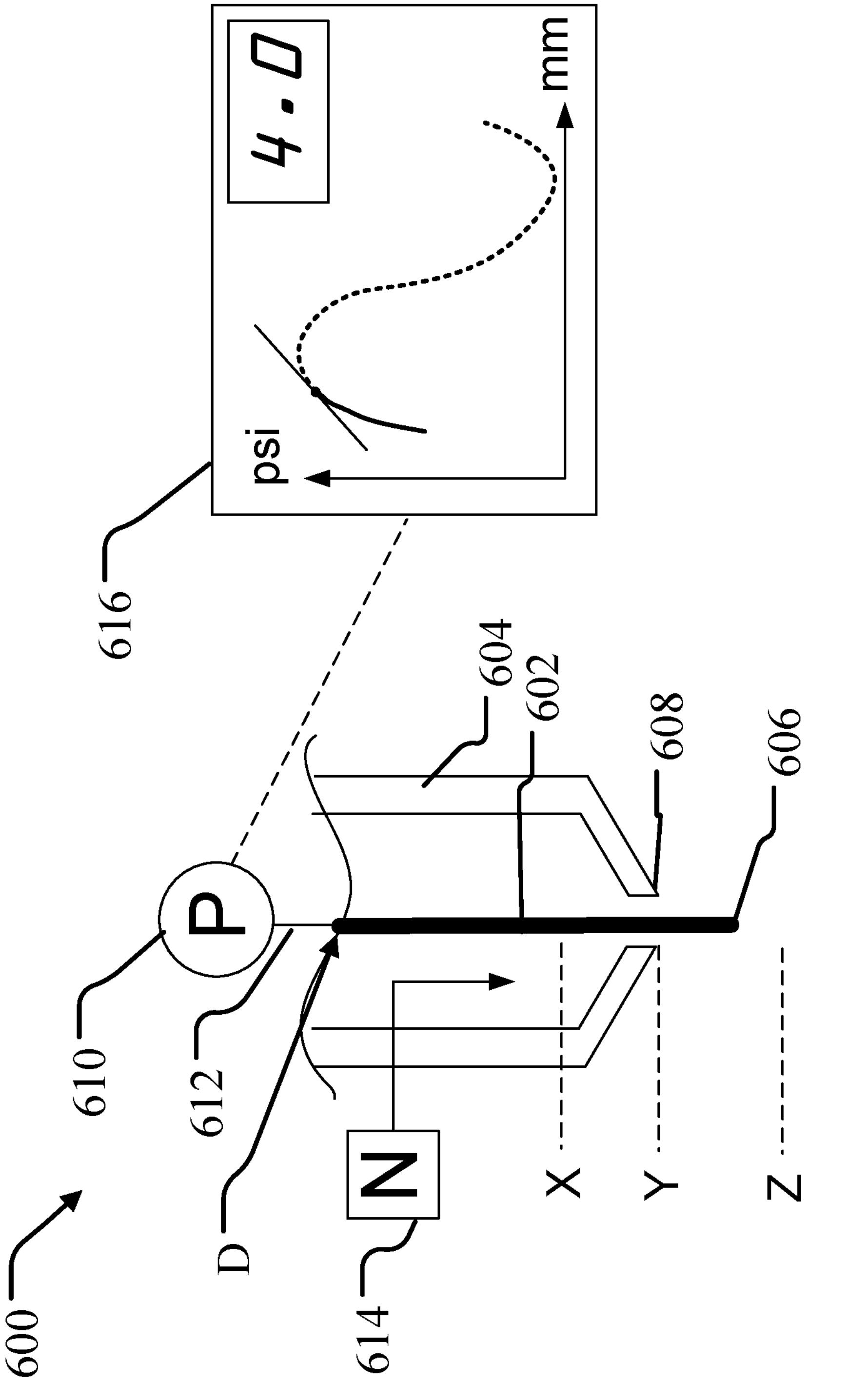
FIG. 6 depicts a schematic view of a system for adjusting a position of an electrode tip relative to a nebulizer nozzle end.

FIG. 6 depicts a schematic view of a system 600 for adjusting a position of an electrospray electrode 602 relative to a nebulizer nozzle 604. Both the electrode 602 and nozzle 604 are depicted as broken for illustrative purposes, and further features of the electrode 602, nozzle 604, and other related components that allow for positioning or operation of either component are not depicted but would be apparent to a person of skill in the art. The electrode 602 includes a tip 606 that is linearly positionable relative to an end 608 of the nebulizer nozzle 604. Further, the electrode 602 is fluidically coupled to a high-resolution pressure gauge 610, e.g., a manometer, via a transfer conduit 612, which may correspond to conduit 125 in FIG. 1. With the pressure gauge 610 connected, the OPI 104 is not connected to the conduit 612. A nebulizer gas source 614 is fluidically coupled to an interior of the nebulizer nozzle 604 for delivery of a nebulizer gas thereto.

Three example positions X, Y, and Z of the tip 606 are depicted in FIG. 6 for illustrative purposes. The tip 606 of the electrode 602 may be positioned in any one of these positions, or other positions not depicted. Example position X corresponds to a position of the tip 606 that is disposed both within the nebulizer nozzle 604 and on a first side of the end 608 thereof. Conversely, example position Z corresponds to a position of the tip 606 that is disposed outside of the nebulizer nozzle 604. As it is outside of the nebulizer nozzle 604, it is also disposed on a second side of the end 608 thereof. Example position Y corresponds to a position of the tip 606 that is substantially flush with the end 608 of the nebulizer nozzle 604. Further, position Y is disposed between positions X and Z. In examples of the methods described herein, all of the tip 606 positions described may all be disposed on the first side of the end 608, all of the tip 606 positions may all be disposed on the second side of the end 608, or one of more of several tip 606 positions may be on opposite sides of the end 608. During performance of the methods described herein, the transfer conduit 612 is dry (e.g., no transport fluid, sample, or other fluid is present therein). The position of the tip 606 relative to the end 608 of the nebulizer nozzle 604 is adjusted within the expanding nebulizer gas while the pressure gauge 610 monitors a change in the pressure condition (e.g., the change in pressure drop in the system 600, as measured at the pressure gauge 610).

As depicted in FIG. 6, a pressure gauge read out 616 may include any one or more of a pressure reading, a pressure curve, a slope of the pressure curve, etc. If the read out is displayed in whole or in part on a connected computing device or display connected to a processor, the pressure curve may also associate the pressure reading with the position of the tip 606. Here, the pressure curve includes the pressure drop detected (in psi) as a function of the position (in mm) of the tip 606. The position of the tip 606 may be measured from a datum D (e.g., a position of the tip 606 deepest within the nozzle 604). With the distance of the nebulizer nozzle end 608 from the datum known, the position of the tip 606 relative to the end 608 may be easily determined. The pressure curve may be plotted (and slope updated) as the pressure changes—the dotted portion of the pressure plot of FIG. 6 is for illustrative purposes only. Thus, a pressure curve may be mapped for an entire range of positions of the electrode, between the two terminal positions of the linear range of motion of the electrode. For any particular nozzle, there may exist a plurality of "local maximums" of pressure drops—that is, there may be more than a single peak on an associated pressure curve. The technologies described herein may be used to determine these local maximums, one of which will correspond to the maximum pressure drop for a given nozzle. In other examples, signals sent from the pressure sensor 610 may be processed by a computing device, in accordance with methods described herein. Pressure monitoring may be performed manually (e.g., by a user or technician), may be an automated process (e.g., where pressure signals from the pressure gauge 610 are sent to a controller that ultimately can control an actuator (e.g., motor 220, FIG. 2) that positions the electrode 602, or a combination thereof. The adjustment can include adjusting the electrode position by rotating its mounting nut (e.g., ferrule 218, FIG. 2).

Figure 7A:
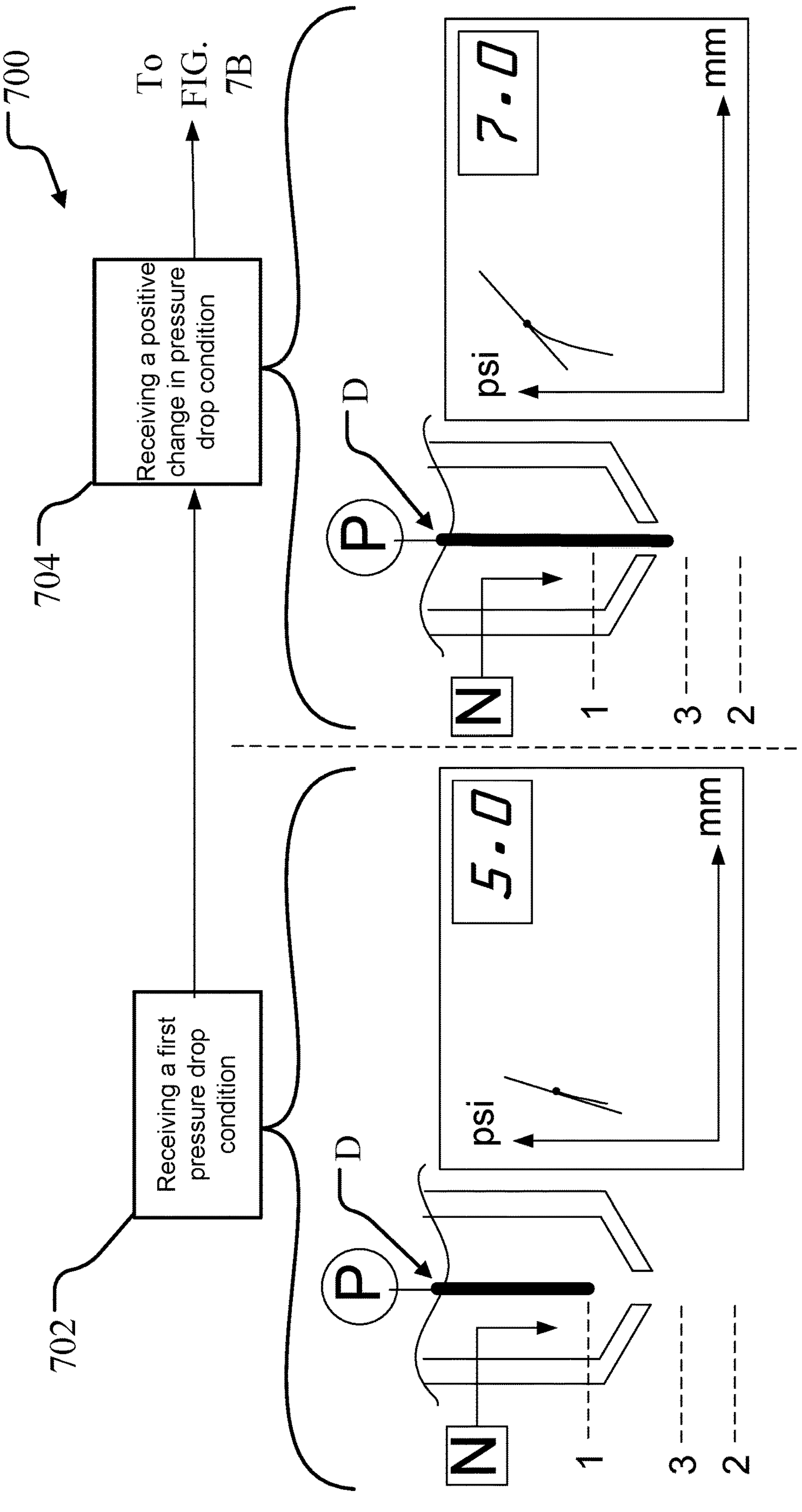
FIGS. 7A-7C depict a method of adjusting a position of an electrode tip relative to a nebulizer nozzle end.
Figure 7B:
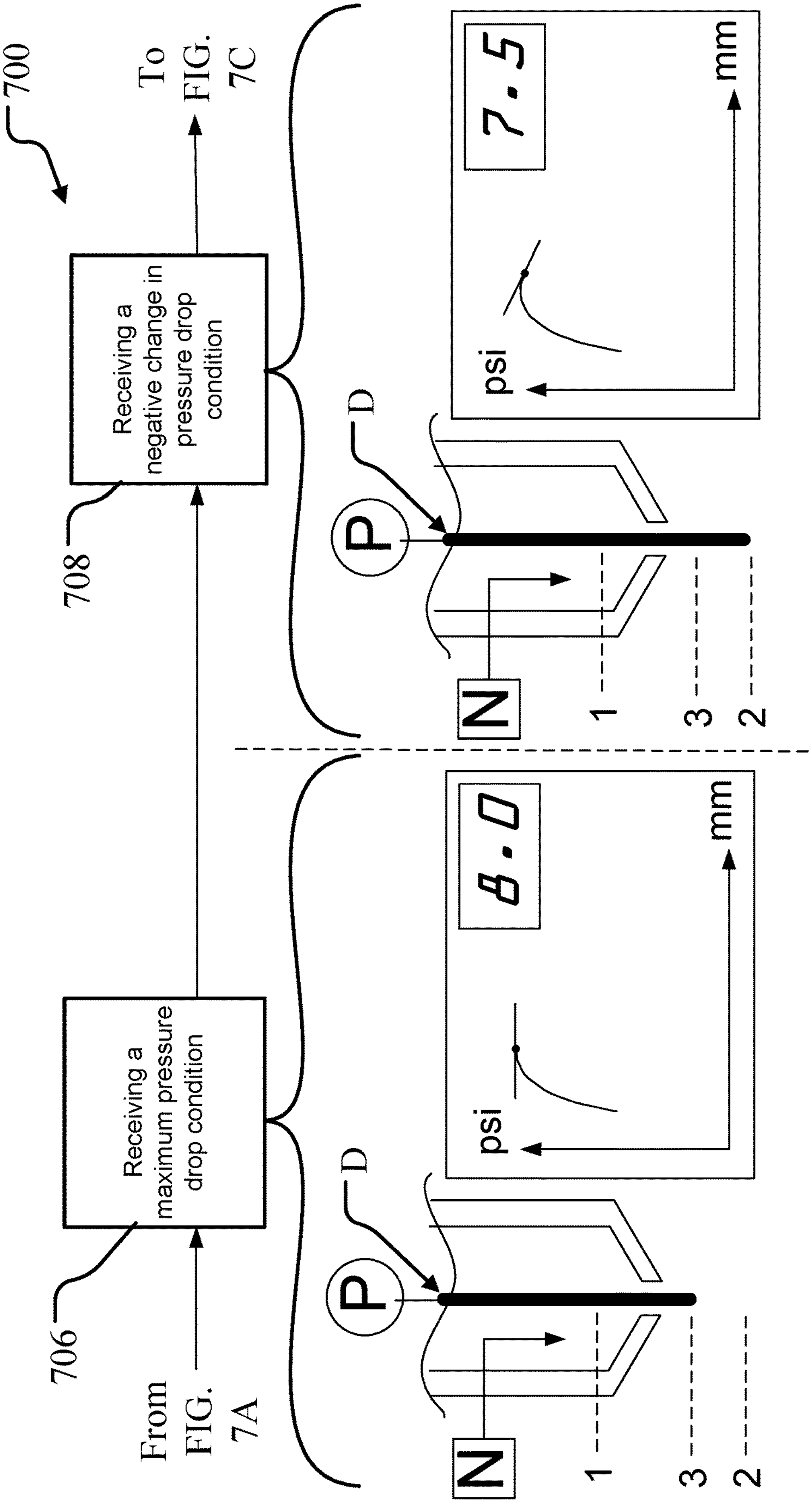
Figure 7C:
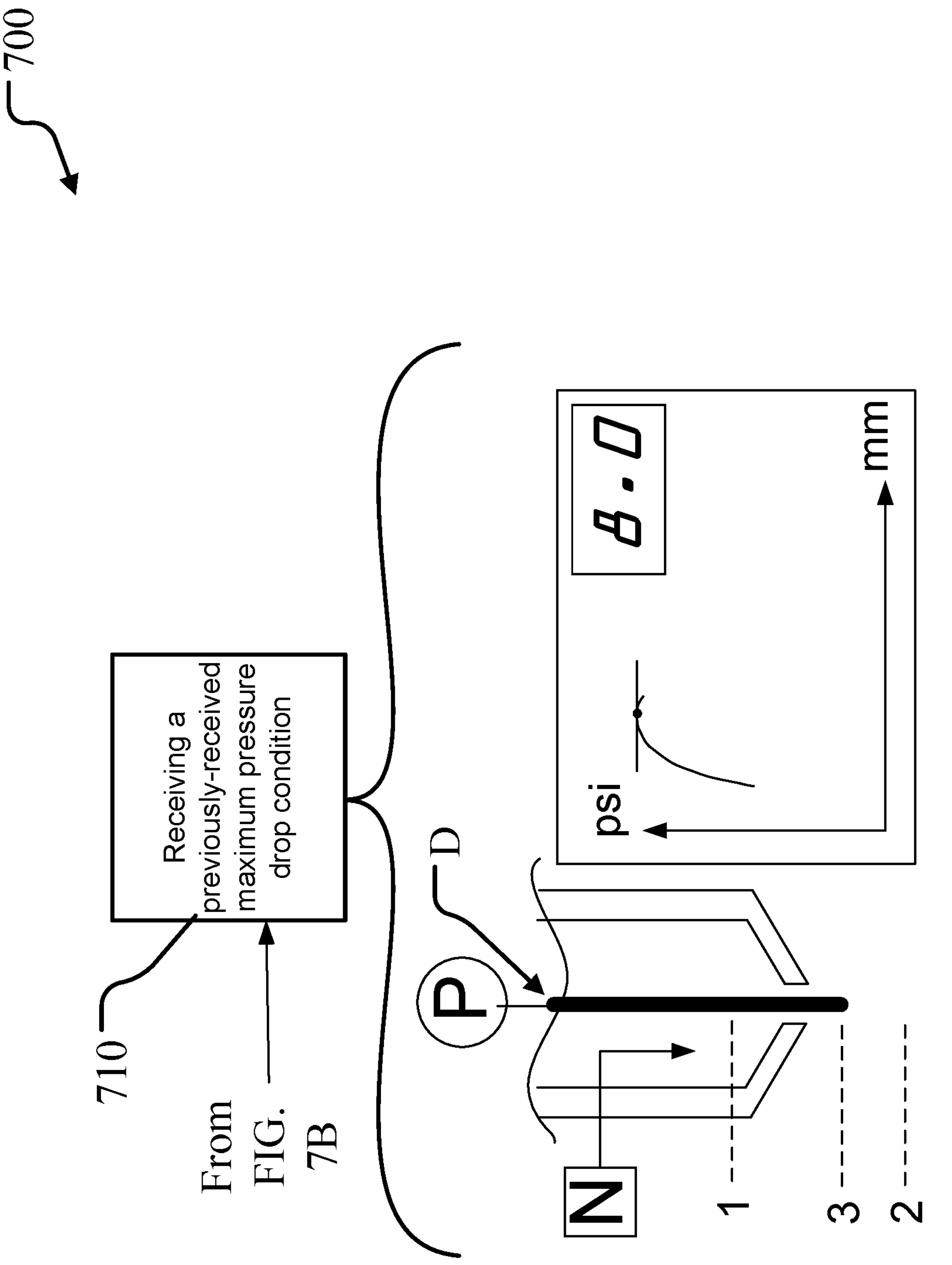

FIGS. 7A-7C depict a method 700 of adjusting a position of a tip of an electrode relative to an end of a nebulizer nozzle of a mass spectrometry device. The method 700 is depicted in the top portion of the figures. Representations of the electrode, nozzle, nebulizer gas source, and pressure gauge, as well as the read out, all depicted in FIG. 6, are depicted (unnumbered) in the bottom portion of FIGS. 7A-7C. As the operations of the method 700 are performed, corresponding changes to the position of the electrode tip and changes to the read out are depicted. The positions 1, 2, and 3, as well as the pressure curve, curve slope, and pressure reading are for illustrative purposes only. Both the method 700 and the conditions of the tip and changes to the read out are described in parallel for clarity.

At the start of the method 700, the pressure gauge is in fluidic communication with the conduit and electrode, the nebulizer gas flows from the gas source, and the tip of the electrode is in a first position. This first position is depicted as position 1 in the bottom portion of FIG. 7A. Further, the pressure condition in the form of a first pressure drop reading of 5.0 psi is depicted on a display. The display further depicts a pressure drop slope for illustrative purposes; such a slope curve is typically generated after a second pressure reading is received; the slope is depicted here at the start of the method 700 for illustrative purposes. Signals received from the pressure gauge may be at any resolution as required or desired, although higher resolution increases accuracy. The method 700 begins with operation 702, receiving a first pressure condition, which may be a pressure drop at the nebulizer nozzle detected at the pressure gauge. With the nebulizer gas flowing, the position of the tip is adjusted in a first direction (e.g., in a direction away from the datum D). This results in a positive change in pressure condition being received, operation 704. At this state, the read out indicates a higher pressure drop (7.0 psi) and the slope of the curve begins to level, but is still positive. With the nebulizer gas still flowing, the position of the tip continues to be adjusted in the first direction.

Flow of the method 700 continues to operation 706 (FIG. 7B), receiving a maximum pressure drop condition. This condition is determined when the read out changes to a maximum pressure drop (here, 8.0 psi) and/or the slope of the curve flattens. However, neither a maximum pressure drop condition nor a flattening of the pressure curve are necessarily determinable with certainty, unless a subsequently-received pressure drop condition reading goes down, or the slope of the curve changes to the negative. As such, the nebulizer gas continues to flow, and the position of the tip continues to be adjusted in the first direction. In operation 708, a negatively-changed pressure drop condition is received. In this context, a negatively changed pressure condition indicates a pressure condition lower than that in operation 706. That is, a reduction in pressure drop (here, to 7.5 psi), or a change in slope to the negative is detected. At this state, the tip is in the second position. Next, the position of the tip is adjusted in a second direction opposite the first direction (e.g., in a direction towards the datum D), and the nebulizer gas continues to flow.

The method 700 continues to operation 710 (FIG. 7C), where a previous maximum pressure condition is received. As noted above, this condition is determined when the read out changes to the earlier received maximum pressure drop (here, 8.0 psi) and/or the flat slope of the curve. This third position is the position of maximum pressure drop. The method 700 described above assumes an initial increase in pressure drop during adjustment of the electrode tip in a first direction. It will be apparent, however, that a change in position of the electrode tip in a first direction may result in a decrease in pressure condition. Under such circumstances, the change in direction may be reversed, and the method 700 performed as indicated above. Further, while the datum D is described as a position of the tip within the nozzle, a datum may also be a position of the tip at the furthest possible position extended from the nozzle, or at some other arbitrary position between the two extremes.

Figure 8A:
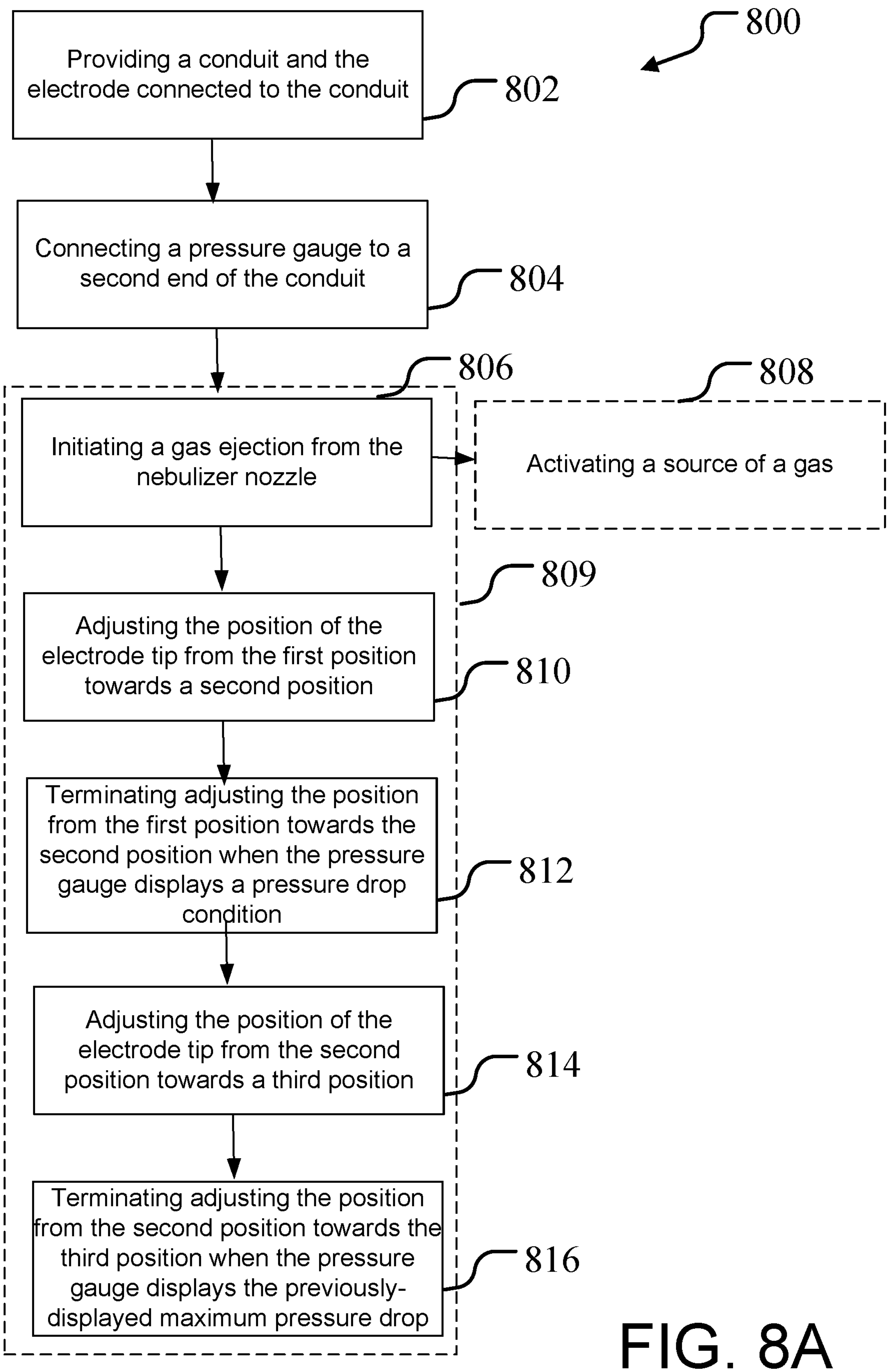
FIGS. 8A and 8B depict other methods of adjusting a position of an electrode tip relative to a nebulizer nozzle end.
Figure 8B:
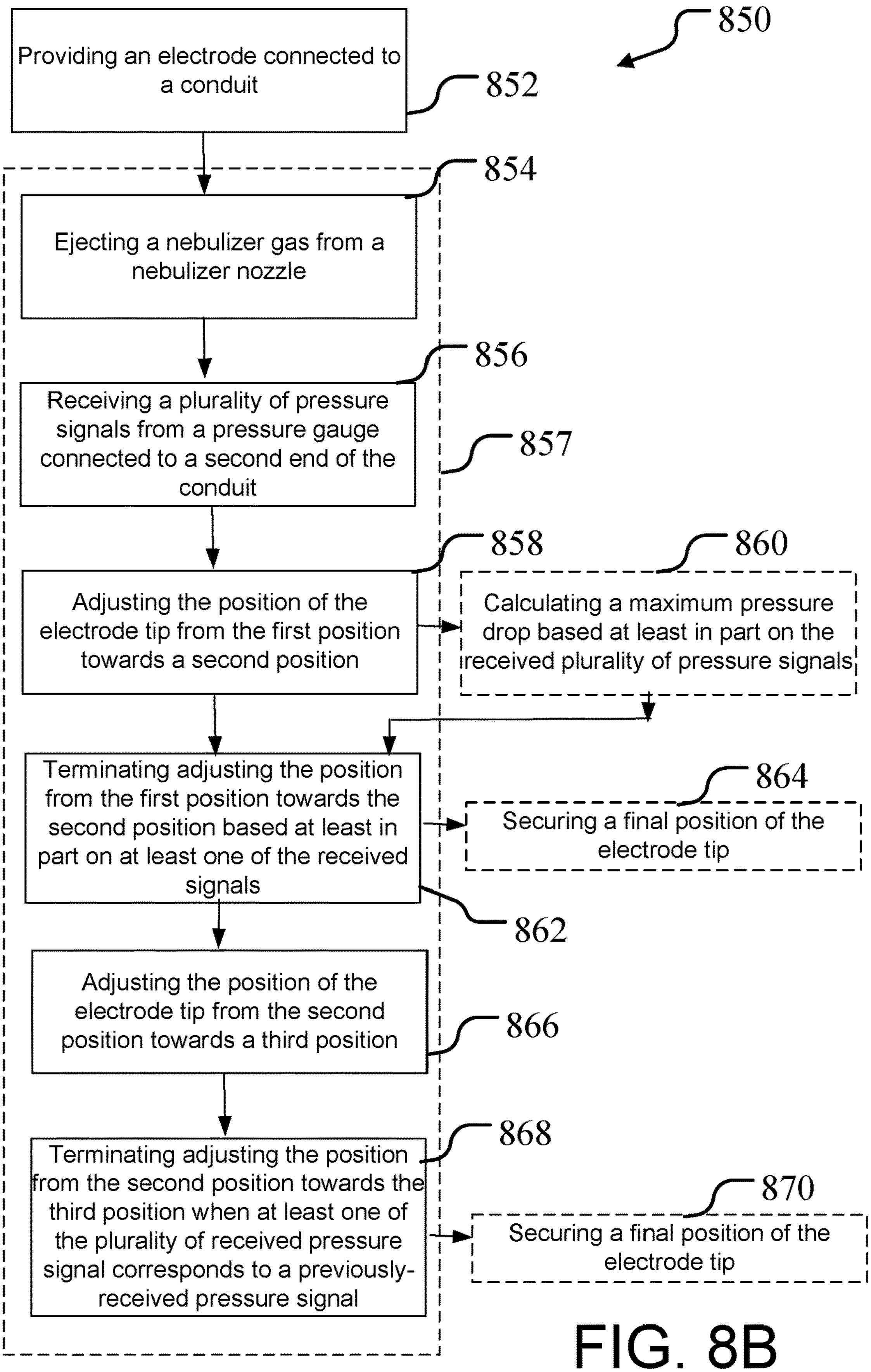

FIGS. 8A and 8B depict other methods 800, 850 of adjusting a position of a tip of an electrode relative to an end of a nebulizer nozzle of a mass spectrometry device. The method 800 begins with operation 802, providing a conduit and the electrode connected to the conduit at a first end thereof. The electrode tip is disposed at a first position relative to the nebulizer nozzle end, which may be flush with the nebulizer nozzle end, within the nebulizer itself, or projecting therefrom. In operation 804, a pressure gauge is connected to a second end of the conduit opposite the first end, and in operation 806, a gas ejection from the nebulizer nozzle with the electrode tip at the first position is initiated. Initiation of the gas flow may include operation 808, activating a source of a gas. The flow of gas may be at a constant rate, and continues for the remainder of the method 800, as depicted by dashed line 809. The flow of gas results in a pressure condition being detected by the pressure gauge. The condition, which may be a pressure drop at the nebulizer nozzle, is detected by the pressure gauge, and may be displayed or sent as a signal to a processing device for further analysis, display, etc., as described elsewhere herein.

The method 800 continues to operation 810, adjusting the position of the electrode tip from the first position towards a second position relative to the nebulizer nozzle end. This adjustment continues until operation 812, which includes terminating adjusting the position from the first position towards the second position when the pressure gauge displays a pressure condition. This pressure condition may be a maximum pressure drop or a pressure drop lower than a previously-displayed maximum pressure drop, as described above with regard to operation 708 of the method 700 of FIG. 7B. This occurs at the second position. Once the second position is reached, the method 800 continues to operation 814, adjusting the position of the electrode tip from the second position towards a third position relative to the nebulizer nozzle end. Adjustment towards this third position is a direction opposite the direction from the first position to the second position. Flow continues to operation 816, terminating adjusting the position from the second position towards the third position when the pressure gauge displays the previously-displayed maximum pressure drop. When this condition is displayed, the electrode tip is at the third position, which is between the first position and the second position. The first, second, and third positions may be at any position relative to the nebulizer nozzle end, e.g., at least one may be on a first side of the nebulizer nozzle end and any remaining positions may be on a second side of the nebulizer nozzle end. In another example, all positions may be on a single side of the nebulizer nozzle end.

The method 850 begins with operation 852, providing the electrode connected to a conduit at a first end of the conduit. The electrode tip is disposed at a first position relative to the nebulizer nozzle end, which may be flush with the nebulizer nozzle end, within the nebulizer itself, or projecting therefrom. Operation 854, ejecting a nebulizer gas from the nebulizer nozzle, and operation 856, receiving a plurality of pressure signals from a pressure gauge connected to a second end of the conduit, are then performed and are sustained during the remainder of the method, as indicated by the dashed box 857. The method 850 continues to operation 858, adjusting the position of the electrode tip from the first position towards a second position relative to the nebulizer nozzle end. Method 850 may include optional operation 860, calculating a maximum pressure drop based at least in part on the received plurality of pressure signals. As noted elsewhere herein, the received pressure signals may be processed and a maximum pressure drop may be calculated based on, for example, a change of a pressure curve slope from a positive slope to a substantially flat slope, an algorithm associated with a particular nebulizer nozzle, or other factors. Regardless, flow continues from either operation 858 or 860 to operation 862, which includes terminating adjusting the position based at least in part on at least one of the received plurality of pressure signals. At this state, the electrode tip is at the second position. If operation 860 was performed, the second position may be a final position and further adjustment need not be performed. In that case, operation 864, securing the final position of the electrode tip, may be performed.

In examples of the method 850 where operation 860 was not performed, flow continues from operation 862 to operation 866, where adjusting the position of the electrode tip from the second position towards a third position relative to the nebulizer nozzle end is performed. As noted above, adjustment towards this third position is a direction opposite the direction from the first position to the second position. Flow continues to operation 868, terminating adjusting the position from the second position towards the third position when at least one of the plurality of received pressure signal corresponds to a previously-received pressure signal. The previously-received pressure signal may correspond to a previously-received maximum pressure drop, indicating that the electrode tip has reached a third and final position. At this point, operation 870, securing the electrode tip in the final position, may be performed.

Figure 9:
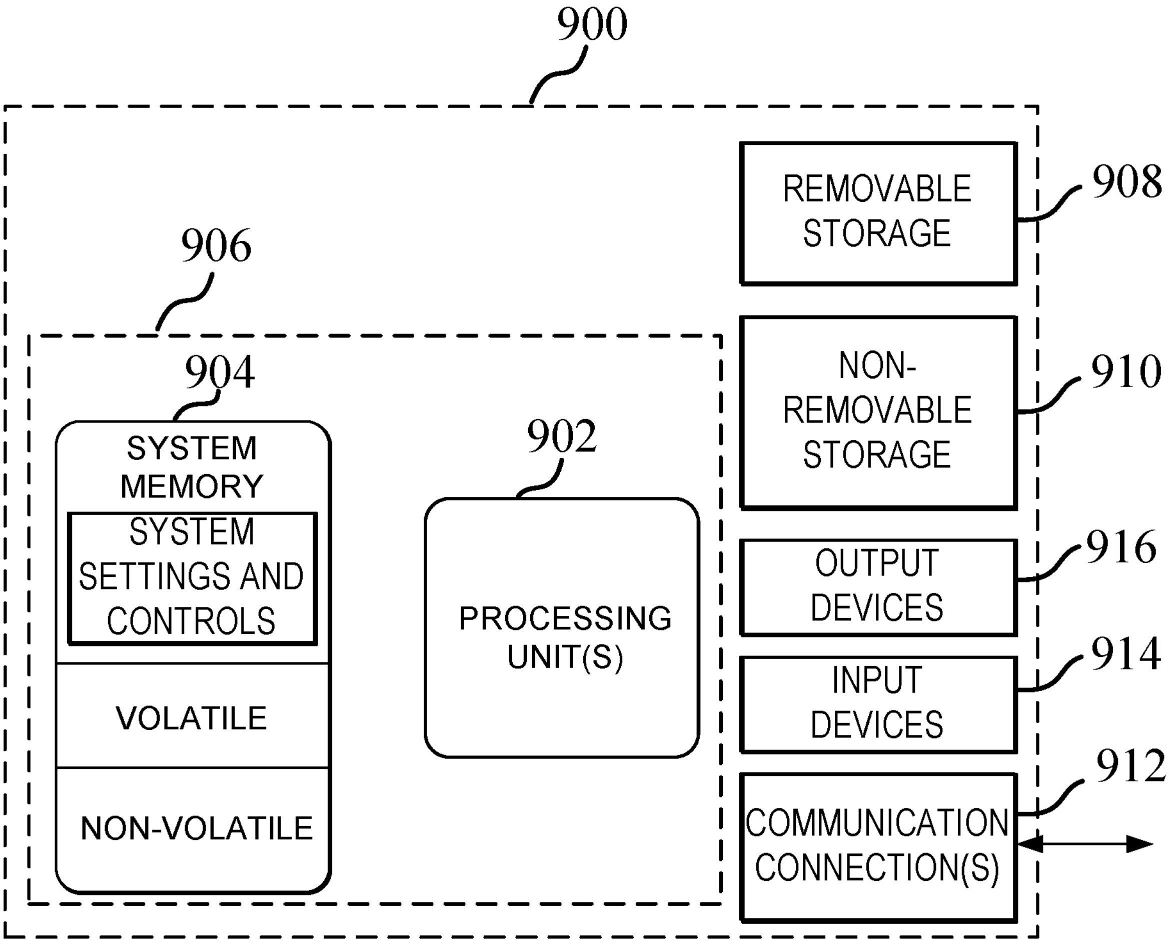
FIG. 9 depicts an example of a suitable operating environment in which one or more of the present examples can be implemented.

FIG. 9 depicts one example of a suitable operating environment 900 in which one or more of the present examples can be implemented. This operating environment may be incorporated directly into the controller for a mass spectrometry system, e.g., such as the controller depicted in FIG. 1. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like. In view of the portability of the processing systems described herein, a laptop or tablet computer may be desirably connected via a wired or wireless connection to a controller such as depicted in FIG. 1, and may send the appropriate control signals before, during, and after an electrode position-setting event, so as to control operation of the various components of the system.

In its most basic configuration, operating environment 900 typically includes at least one processing unit 902 and memory 904. Depending on the exact configuration and type of computing device, memory 904 (storing, among other things, instructions to control the transport liquid pump, sensors, valves, gas source, etc., or perform other methods disclosed herein) can be volatile (such as RAM), non-volatile (such as ROM, flash memory, etc.), or some combination of the two. This most basic configuration is illustrated in FIG. 9 by dashed line 906. Further, environment 900 can also include storage devices (removable, 908, and/or non-removable, 910) including, but not limited to, magnetic or optical disks or tape. Similarly, environment 900 can also have input device(s) 914 such as touch screens, keyboard, mouse, pen, voice input, etc., and/or output device (s) 916 such as a display, speakers, printer, etc. Also included in the environment can be one or more communication connections 912, such as LAN, WAN, point to point, Bluetooth, RF, etc.

Operating environment 900 typically includes at least some form of computer readable media. Computer readable media can be any available media that can be accessed by processing unit 902 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 900 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by computer system 900 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 900 is part of a network that stores data in remote storage media for use by the computer system 900.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method of adjusting a position of a tip of an electrode relative to an end of a nebulizer nozzle of a mass spectrometry device, the method comprising:

providing a conduit and the electrode connected to the conduit at a first end of the conduit, wherein the electrode tip is disposed at a first position relative to the nebulizer nozzle end;

connecting a pressure gauge to a second end of the conduit opposite the first end;

initiating a gas ejection from the nebulizer nozzle with the electrode tip at the first position;

during the gas ejection, adjusting the position of the electrode tip from the first position towards a second position relative to the nebulizer nozzle end; and terminating adjusting the position from the first position towards the second position based on a pressure condition displayed by the pressure gauge, wherein upon terminating adjusting the position from the first position towards the second position, the electrode tip is at the second position.

2. The method of claim 1, wherein when at the first position, the electrode tip is flush with the nebulizer nozzle end.

3. The method of claim 1, wherein the pressure condition comprises a maximum pressure drop.

4. The method of claim 1, wherein the pressure condition comprises a pressure drop lower than a previously-displayed maximum pressure drop.

5. The method of claim 4, further comprising, subsequent to terminating adjusting the position from the first position to the second position, adjusting the position of the electrode tip from the second position towards a third position relative to the nebulizer nozzle end.

6. The method of claim 5, further comprising terminating adjusting the position from the second position towards the third position when the pressure gauge displays the previously-displayed maximum pressure drop, wherein upon terminating adjusting the position from the second position towards the third position, the electrode tip is at the third position.

7. The method of claim 5, wherein the third position is between the first position and the second position.

8. The method of claim 5, wherein at least one of the first position, the second position, and the third position is on a first side of the nebulizer nozzle end and wherein at least another of the first position, the second position, and the third position is on a second side of the nebulizer nozzle end.

9. The method of claim 1, wherein initiating the gas ejection comprises activating a source of a gas.

10. The method of claim 9, wherein the gas ejection is at a constant flowrate.

11. A method of adjusting a position of a tip of an electrode relative to an end of a nebulizer nozzle of a mass spectrometry device, the method comprising:

providing the electrode, wherein the electrode is connected to a conduit at a first end of the conduit, and wherein the electrode tip is disposed at a first position relative to the nebulizer nozzle end;

ejecting a nebulizer gas from the nebulizer nozzle;

during ejection of the nebulizer gas, receiving a plurality of pressure signals from a pressure gauge connected to a second end of the conduit while adjusting the position of the electrode tip from the first position towards a second position relative to the nebulizer nozzle end; and terminating adjusting the position based at least in part on at least one of the received plurality of pressure signals, wherein upon terminating adjusting the position, the electrode tip is at the second position.

12. The method of claim 11, further comprising calculating a maximum pressure drop based at least in part on the received plurality of pressure signals and terminating adjusting the position when at least one of the plurality of received pressure signals corresponds to the calculated maximum pressure drop.

13. The method of claim 12, wherein the calculated maximum pressure drop is based at least in part on a pressure curve generated based at least in part on the received plurality of pressure signals.

14. The method of claim 13, wherein the calculated maximum pressure drop is based at least in part on a sign change in slope of the pressure curve.

15. The method of claim 11, wherein the at least one of the received pressure signals corresponds to a pressure drop lower than a previously-received maximum pressure drop.

16. The method of claim 11, further comprising, subsequent to terminating adjusting the position from the first position to the second position, adjusting the position of the electrode tip from the second position towards a third position relative to the nebulizer nozzle end.

17. The method of claim 16, further comprising terminating adjusting the position from the second position towards the third position when at least one of the plurality of received pressure signal corresponds to a previously-received pressure signal.

18. The method of claim 17, wherein the previously-received pressure signal corresponds to a previously-received maximum pressure drop.

19. The method of claim 11, further comprising securing a final position of the electrode tip in the second position.

20. The method of claim 16, further comprising securing a final position of the electrode tip in the third position.

* * * * *